United States Patent
Suyama et al.

(10) Patent No.: US 10,974,438 B2
(45) Date of Patent: Apr. 13, 2021

(54) CONTAINER PRODUCTION METHOD BY LIQUID BLOW MOLDING

(71) Applicants: Kenichi Suyama, Tokyo (JP); Yuichi Okuyama, Tokyo (JP)

(72) Inventors: Kenichi Suyama, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 20 days.

(21) Appl. No.: 16/077,679

(22) PCT Filed: Jan. 23, 2017

(86) PCT No.: PCT/JP2017/002156
§ 371 (c)(1),
(2) Date: Aug. 13, 2018

(87) PCT Pub. No.: WO2017/168995
PCT Pub. Date: Oct. 5, 2017

(65) Prior Publication Data
US 2019/0030780 A1    Jan. 31, 2019

(30) Foreign Application Priority Data
Mar. 31, 2016  (JP) .............................. JP2016-072571

(51) Int. Cl.
| B29C 49/46 | (2006.01) |
| B29C 49/12 | (2006.01) |
| B29C 49/48 | (2006.01) |
| B29C 49/54 | (2006.01) |
| B29C 49/14 | (2006.01) |

(Continued)

(52) U.S. Cl.
CPC .............. *B29C 49/46* (2013.01); *B29C 49/12* (2013.01); *B29C 49/06* (2013.01); *B29C 49/14* (2013.01);
(Continued)

(58) Field of Classification Search
CPC .. B29C 49/46; B29C 49/58; B29C 2049/4664
See application file for complete search history.

(56) References Cited

U.S. PATENT DOCUMENTS

2014/0367895 A1* 12/2014 Sato ........................ B29C 49/12
                                                                    264/532

FOREIGN PATENT DOCUMENTS

| JP | H04-131220 A | 5/1992 |
| JP | H05-193635 A | 8/1993 |

(Continued)

OTHER PUBLICATIONS

Oct. 2, 2018 International Preliminary Report on Patentability issued in International Patent Application No. PCT/JP2017/002156.
(Continued)

*Primary Examiner* — Jacob T Minskey
*Assistant Examiner* — Jennifer A Kessie
(74) *Attorney, Agent, or Firm* — Oliff PLC

(57) ABSTRACT

A container production method by liquid blow molding. The method includes a pushing step in which a liquid is collected from a preform at the timing at which the pressure inside of the preform starts rising by pushing of the expanded and deformed preform by a movable mold portion of a blow molding mold so that the rise in the pressure is suppressed or prevented.

5 Claims, 3 Drawing Sheets

(51) Int. Cl.
  *B29C 49/06* (2006.01)
  *B67C 3/22* (2006.01)
  *B67C 3/08* (2006.01)
  *B29K 23/00* (2006.01)
  *B29K 67/00* (2006.01)
  *B29L 31/00* (2006.01)

(52) U.S. Cl.
  CPC .... *B29C 49/541* (2013.01); *B29C 2049/4664* (2013.01); *B29C 2049/4807* (2013.01); *B29C 2049/4892* (2013.01); *B29K 2023/12* (2013.01); *B29K 2067/003* (2013.01); *B29L 2031/7158* (2013.01); *B67C 3/08* (2013.01); *B67C 3/223* (2013.01)

(56) References Cited

FOREIGN PATENT DOCUMENTS

| JP | 2011-218722 A | 11/2011 |
|----|---------------|---------|
| JP | 2013-132861 A | 7/2013 |
| JP | 2014-069441 A | 4/2014 |
| WO | 2013/147065 A1 | 10/2013 |
| WO | 2016/017082 A1 | 2/2016 |
| WO | 2016/084302 A1 | 6/2016 |

OTHER PUBLICATIONS

Feb. 28, 2017 International Search Report issued in International Patent Application No. PCT/JP2017/002156.

Sep. 10, 2019 Office Action issued in Japanese Patent Application No. 2016-072571.

Nov. 19, 2019 Office Action issued in Japanese Patent Application No. 2016-072571.

Sep. 20, 2019 Extended European Search Report issued in European Application No. 17773545.3.

Apr. 7, 2020 Office Action issued in Japanese Patent Application No. 2016-072571.

* cited by examiner

CONTAINER PRODUCTION METHOD BY LIQUID BLOW MOLDING

TECHNICAL FIELD

The present disclosure relates to a container production method by liquid blow molding in which a pressurized liquid is supplied into a resin preform to mold the preform into a container of a shape conforming to an inner surface of a cavity of a blow molding mold.

BACKGROUND

Resin containers, typical examples of which are polypropylene (PP) bottles and polyethylene terephthalate (PET) bottles, are used to hold a variety of liquids, such as beverages, cosmetic products, pharmaceutical products, detergents, and toiletries including shampoo, as the content liquids. Such a container is generally produced by blow molding a preform formed by a thermoplastic resin material as mentioned above.

As an example of blow molding in which a pressurizing medium is supplied into a resin preform to mold the preform into a container of a shape conforming to an inner surface of a cavity of a blow molding mold, liquid blow molding in which a liquid is used as a pressurizing medium is known.

Further, as a blow molding in which air is used as a pressurizing medium, a technique of using, as a blow molding mold, one that includes a body mold portion that forms a part of an inner surface of a cavity of the mold and a movable mold portion that forms another part of the inner surface of the cavity is used has been known. In the technique, pressurized air is supplied into a preform disposed inside of the body mold portion to expand and deform the preform, and the movable mold portion is moved relative to the body mold portion toward the expanded and deformed preform, thus the preform is pushed by the movable mold portion and is molded into a container (see, for example, PTL1).

CITATION LIST

Patent Literature

PTL 1: JP2011218722A

SUMMARY

Technical Problem

However, in the case of producing a container by the liquid blow molding in which a liquid is used as a pressurizing medium, when a preform is pushed by the movable mold portion of the blow molding mold to mold a container as illustrated in PTL 1, an excessive pressure acts on inside of the preform or on a fluid path when the preform is pushed by the movable mold portion, thus a container cannot be stably produced.

The present disclosure has been conceived in view of the above problem, and the present disclosure is to provide a container production method by liquid blow molding in which, a container can be stably produced when the container is molded by pushing an expanded and deformed preform by a movable mold portion of a blow molding mold.

Solution to Problem

The disclosed container production method by liquid blow molding is a container production method by liquid blow molding in which a pressurized liquid is supplied into a resin preform to mold the preform into a container of a shape conforming to an inner surface of a cavity of a blow molding mold, and as the blow molding mold, one that includes a body mold portion forming a part of the inner surface of the cavity and a movable mold portion forming another part of the inner surface of the cavity is used. The method includes an expansion and deformation step in which a pressurized liquid is supplied into the preform disposed in the body mold portion to expand and deform the preform; and a pushing step in which the movable mold portion is moved relative to the body mold portion toward the preform expanded and deformed so that the preform is pushed by the movable mold portion, and the liquid is collected from inside of the preform at the timing at which a pressure inside of the preform starts rising by the movable mold portion's push so that the rise in the pressure is suppressed or prevented.

Further, in a preferred embodiment of the disclosed container production method by liquid blow molding, in the expansion and deformation step, a plunger is moved in a pressurizing direction to supply a pressurized liquid into the preform, and in the pushing step, the plunger is moved in a pressure reducing direction to collect the liquid from inside of the preform.

Moreover, in another preferred embodiment of the disclosed container production method by liquid blow molding, a bottom portion or a handle portion of the container is formed by the movable mold portion.

Advantageous Effect

According to the present disclosure, a liquid is collected from inside of the preform at the timing at which a pressure inside of the preform starts rising by pushing of the expanded and deformed preform by the movable mold portion of the blow molding mold so that the rise in the pressure is suppressed or prevented. Thus a container can be stably molded.

Therefore, according to the disclosed container production method by liquid blow molding, a container can be stably molded when the container is molded by pushing the expanded and deformed preform by the movable mold portion of the blow molding mold.

DETAILED DESCRIPTION

The present disclosure will be described in detail below with reference to the drawings.

The disclosed container production method by liquid blow molding (hereinafter simply referred to also as a "container production method") is a container production method by liquid blow molding in which a pressurized liquid is supplied into a resin preform to mold the preform into a container of a shape conforming to an inner surface of a cavity of a blow molding mold. In the method, as the blow molding mold, one having a body mold portion that forms a part of the inner surface of the cavity and a movable mold portion that forms another part of the inner surface of the cavity is used.

Further, the disclosed container production method includes an expansion and deformation step in which a pressurized liquid is supplied into the preform disposed in the body mold portion to expand and deform the preform; and a pushing step in which the movable mold portion is moved relative to the body mold portion toward the expanded and deformed preform so that the preform is pushed by the movable mold portion, and the liquid is collected from inside of the preform at the timing at which a pressure inside of the preform starts rising by the movable mold portion's push so that a rise in the pressure is suppressed or prevented.

Figure 1:
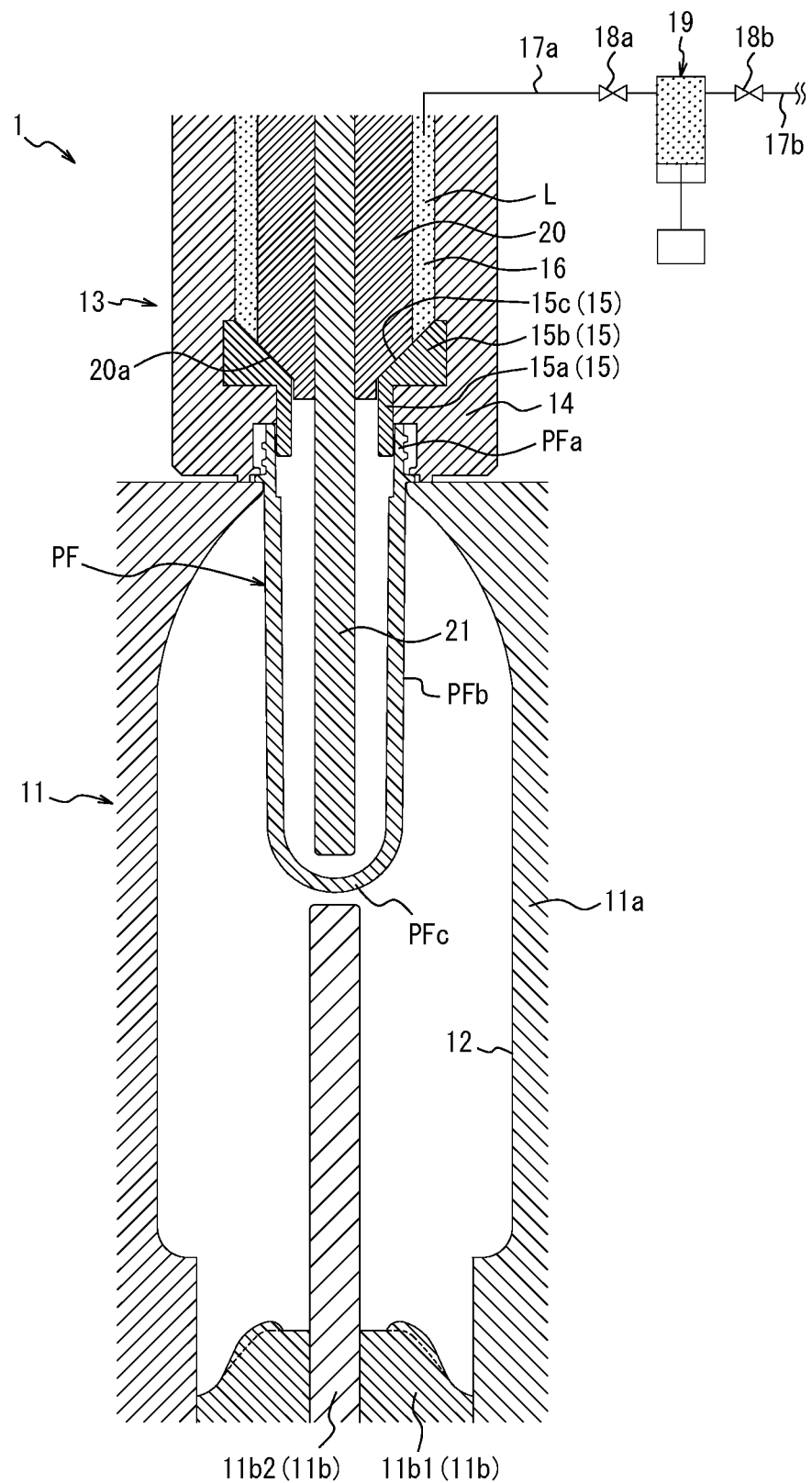
FIG. 1 is an explanatory drawing of a liquid blow molding apparatus used for a container production method by liquid blow molding according to one embodiment of the present disclosure, illustrating a state where a preform is set.
Figure 2:
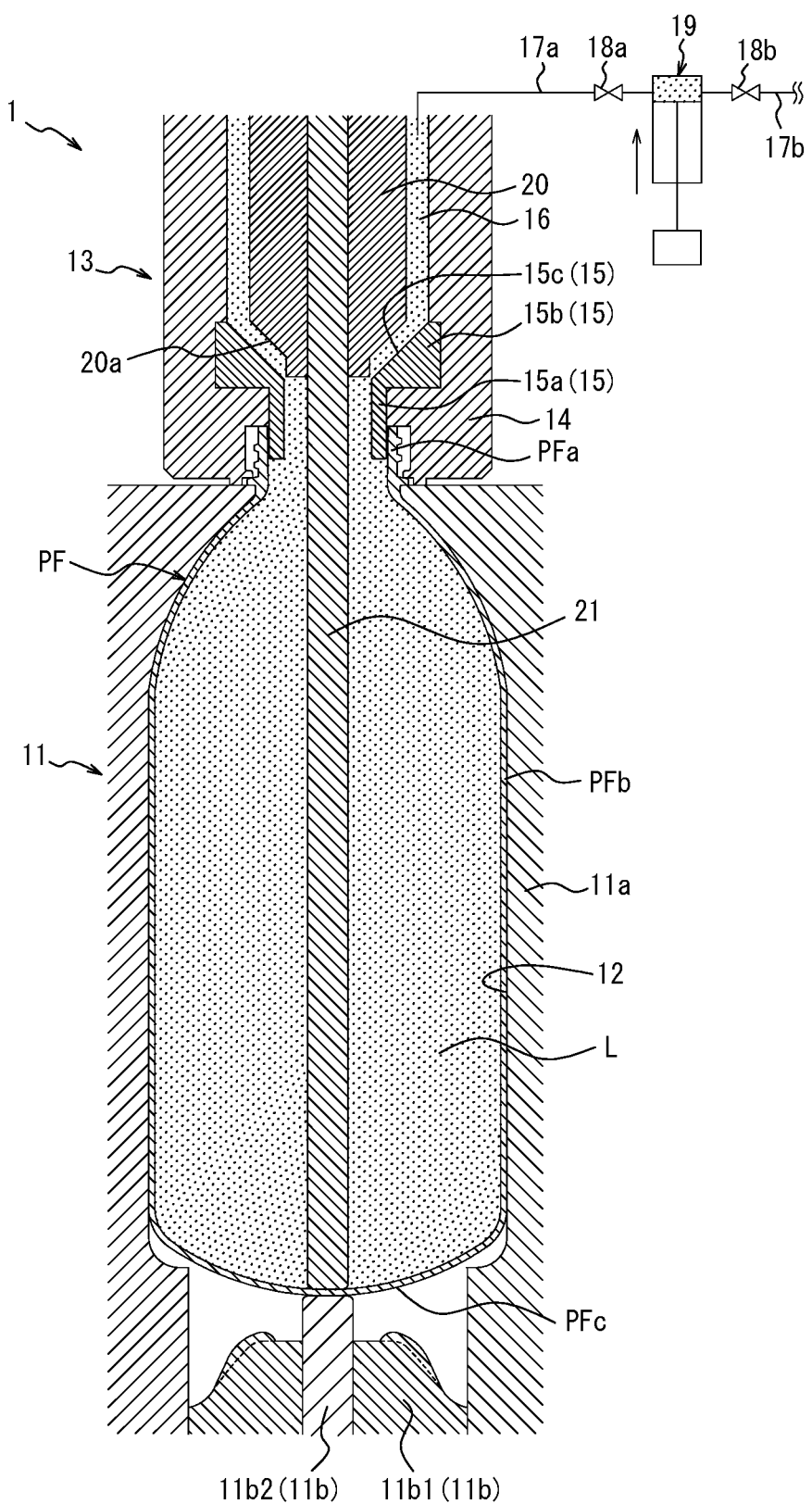
FIG. 2 is an explanatory drawing illustrating a state of an expansion and deformation step of the container production method by liquid blow molding according to one embodiment of the present disclosure.
Figure 3:
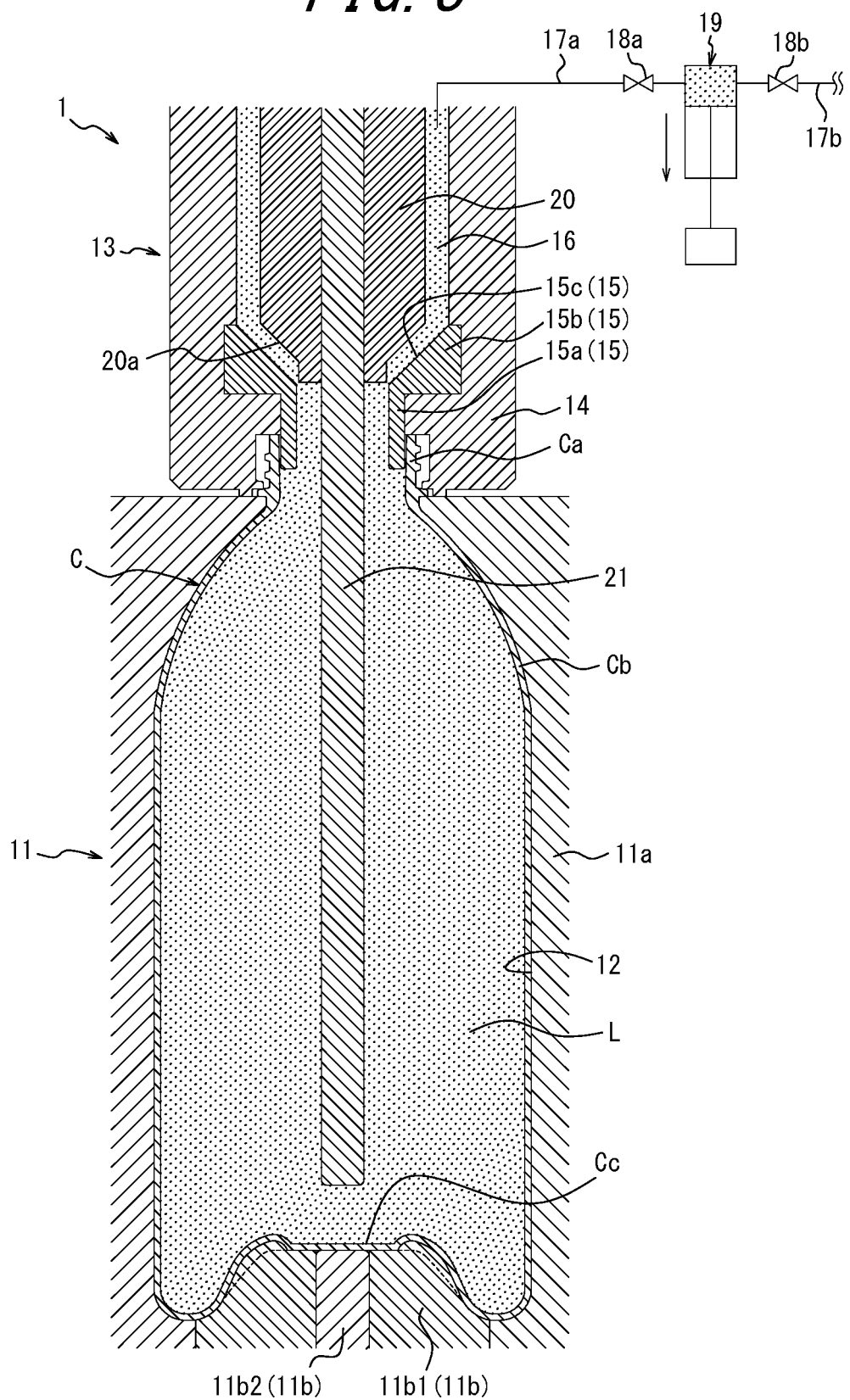
FIG. 3 is an explanatory drawing illustrating a state of a pushing step of the container production method by liquid blow molding according to one embodiment of the present disclosure.

The disclosed container production method can be performed by using a liquid blow molding apparatus 1 as illustrated in FIGS. 1 to 3.

The liquid blow molding apparatus 1 illustrated in FIGS. 1 to 3 produces a liquid L containing container C by liquid blow molding a resin preform PF. It is to be noted that the liquid blow molding is a blow molding in which a pressurized liquid L is supplied into the preform PF to mold the preform PF into a container C of a shape conforming to an inner surface of a cavity 12 of a blow molding mold 11.

As the liquid L, a liquid to be contained as a content liquid in the container C can be used. Examples of such a liquid include a beverage, a cosmetic product, a pharmaceutical product, a detergent, and a toiletry including shampoo.

The preform PF can be obtained through injection molding, direct blow molding, extrusion molding and the like, by using thermoplastic resins such as polypropylene (PP) and polyethylene terephthalate (PET) as materials. As illustrated in FIG. 1, for example, the preform PF may be formed into a substantially test tube shape including a cylindrical mouth PFa, a cylindrical trunk PFb connecting to the mouth PFa and a hemispherical bottom PFc connecting to the trunk PFb.

It is to be noted that the preform PF may be changed into various shapes as long as it can be liquid blow molded into a container C.

Further, a male screw is provided to an outer wall surface of the mouth PFa to screw a closing cap to a mouth Ca of the content liquid-containing container C after molding. It is to be noted that, instead of a male screw, an engagement portion (undercut portion) for fitting may be provided to the outer wall surface of the mouth PFa to allow for capping. Further, other than such a closing cap, a mounting cap for a discharge apparatus with pump or a mounting tubular portion of a spout plug may be attached to the mouth Ca of the container C.

The preform PF can be, after subjecting to heating in advance to a predetermined temperature at which stretchability is achieved by using a heater or the like, disposed in the blow molding mold 11 in a standing posture where the mouth PFa protrudes upward from the cavity 12, as illustrated in FIG. 1.

The liquid blow molding apparatus 1 has a blow molding mold 11 that includes the cavity 12. In the illustrated example, the cavity 12 is formed into a bottle shape, and opens upward on an upper surface of the blow molding mold 11.

Further, the blow molding mold 11 has a body mold portion 11a that forms a part of the inner surface of the cavity 12 and a movable mold portion 11b that forms another part of the inner surface of the cavity 12. As illustrated, a part of the inner surface of the cavity 12 formed by the body mold portion 11a can correspond to a trunk Cb of the container C. Further, as illustrated, another part of the inner surface of the cavity 12 formed by the movable mold portion 11b can correspond to a bottom Cc of the container C. Although not illustrated in detail, the body mold portion 11a can be opened left and right, and a liquid L-containing container C can be taken out from the blow molding mold 11 by opening the body mold portion 11a.

As illustrated, the movable mold portion 11b can be configured to have a pick pin 11b2 that is vertically movable along the axial center of the cavity 12 relative to the movable mold portion body 11b1.

Further, in the illustrated example, the movable mold portion 11b forms a domed inner surface with its center bulged upward, and is vertically movable relative to the body mold portion 11a. Further, as illustrated in FIGS. 2 and 3, the movable mold portion 11b is configured to move between a position after being pushed (a position illustrated in FIG. 3) where a part of the inner surface of the cavity 12 formed by the body mold portion 11a and another part of the inner surface of the cavity 12 formed by the movable mold portion 11b are continuous and a position before being pushed (a position illustrated in FIG. 2) where the movable mold portion 11b moves downward from the position after being pushed with respect to the body mold portion 11a.

A nozzle unit 13 is provided above the blow molding mold 11 such that it is vertically movable relative to the blow molding mold 11. The nozzle unit 13 includes a body block 14 and a blow nozzle 15.

The blow nozzle 15 is configured by integrally forming, by using for example steel or resin material, a nozzle body 15a formed into a cylindrical shape and inserted into the mouth PFa of the preform PF and a large-diameter holding portion 15b integrally formed with the nozzle body 15a, and is fixed to the body block 14 by fitting the holding portion 15b into the inner surface of the body block 14.

The nozzle body 15a is disposed coaxially with the cavity 12 of the blow molding mold 11 and is configured, when the nozzle unit 13 goes down to a predetermined position, to engage with the mouth PFa of the preform PF attached to the blow molding mold 11.

A supply path 16 extending coaxially with the nozzle body 15a in the vertical direction is provided inside of the body block 14, and is connected to the blow nozzle 15 at the lower end thereof.

A pressurized liquid supply portion 19 is connected to the supply path 16 through a first piping 17a and a first opening-closing valve 18a that can open and close the first piping 17a. The pressurized liquid supply portion 19 is connected to a supply source (not illustrated) of the liquid L through a second piping 17b and a second opening-closing valve 18b that can open and close the second piping 17b. The pressurized liquid supply portion 19 can supply a liquid L pressurized to a specific pressure to the supply path 16 through the first piping 17a.

The pressurized liquid supply portion 19 can be configured by a plunger connected to a drive source such as a servo motor, for example. In this case, when the plunger is moved in the pressurizing direction as illustrated in FIG. 2, a pressurized liquid L can be supplied into the preform PF. Further, on the contrary, when the plunger is moved in the pressure reducing direction as illustrated in FIG. 3, the liquid L can be collected from inside of the preform PF toward the plunger. It is to be noted that the first opening-closing valve 18a and the second opening-closing valve 18b can be configured by a solenoid valve whose opening and closing is controlled by a control device not illustrated.

When the pressurized liquid L is supplied from the pressurized liquid supply portion 19 to the supply path 16, as illustrated in FIG. 2, the liquid L is supplied from the supply path 16 through the blow nozzle 15 into the preform PF disposed in the blow molding mold 11. Thus, the preform PF is expanded and deformed by the pressurized liquid L in the cavity 12 of the blow molding mold 11.

A seal pin 20 for opening and closing the supply path 16 with respect to the blow nozzle 15 is disposed in the supply path 16. The seal pin 20 is formed into a columnar shape extending along the axial center of the supply path 16, and is vertically movable relative to the body block 14 in the supply path 16. On the other hand, a tapered closing surface 15c is provided over the holding portion 15b of the blow nozzle 15. When the seal pin 20 moves down to the stroke end and a tapered surface 20a provided at the lower end of the seal pin 20 comes into contact with the closing surface 15c, communication between the supply path 16 and the nozzle body 15a is blocked by the seal pin 20, and the supply path 16 is closed with respect to the blow nozzle 15. On the other hand, when the seal pin 20 moves upward and the tapered surface 20a provided at the lower end of the seal pin 20 separates from the closing surface 15c, the supply path 16 and the nozzle body 15a are communicated with each other and the supply path 16 is opened with respect to the blow nozzle 15, that is, in an open state.

Therefore, as illustrated in FIG. 2, the pressurized liquid supply portion 19 is operated in the pressurizing direction with the nozzle body 15a engaged with the mouth PFa of the preform PF, the seal pin 20 opened to allow communication between the supply path 16 and the blow nozzle 15, the second opening-closing valve 18b closed and the first opening-closing valve 18a opened, and as a result, the pressurized liquid L is supplied from the pressurized liquid supply portion 19 through the first piping 17a, the supply path 16 and the blow nozzle 15 into the preform PF, and the preform PF can be expanded and deformed.

Further, at this time, the movable mold portion 11b moves from the position before being pushed as illustrated in FIG. 2 also to the position after being pushed as illustrated in FIG. 3 while pushing the bottom PFc of the expanded and deformed preform PF to deform it. Then, the liquid blow molding apparatus 1 is configured to collect the liquid L from inside of the preform PF at the timing at which the pressure inside of the preform PF starts rising by being pushed by the movable mold portion 11b so that a rise in the pressure is suppressed or prevented.

Here, "the timing at which the pressure inside of the preform PF starts rising" means the timing at which the pressure inside of the preform PF rises by a predetermined value when the liquid L is not collected from inside of the preform PF. The "predetermined value" means that, when the pressure rises by the predetermined value, a possibility of causing a molding failure of the container C increases to some extent. The predetermined value can be appropriately set by a pre-mass production test or the like. The liquid blow molding apparatus 1 may be configured to detect the "pressure inside of the preform PF" by a pressure detection device provided at the first piping 17a, for example, compare the detection value with the "predetermined value," and determine that the "timing" arrives. Further, instead of detecting an actual pressure in the aforementioned manner, the liquid blow molding apparatus 1 may be configured to determine the timing (time or the like) at which the pressure inside of the preform PF rises by the "predetermined value" by a pre-mass production test or the like in advance and collect the liquid L from inside of the preform PF at the predetermined timing.

Further, the liquid blow molding apparatus 1 may be configured to collect the liquid L from inside of the preform PF toward the pressurized liquid supply portion 9 by operating the pressurized liquid supply portion 19 configured by a plunger in the pressure reducing direction with the first opening-closing valve 17a opened and the second opening-closing valve 17b closed. It is to be noted that, apart from the pressurized liquid supply portion 19, a liquid collection device such as a plunger for collection is provided, for example, and the liquid L may be collected from inside of the preform PF toward the liquid collection device.

Here, the "collection" of the liquid L from inside of the preform PF may be performed by absorbing it by a negative pressure generated outside the preform PF by a plunger or the like, or instead of generating such a negative pressure, a liquid pushed out from the preform PF may be collected by receiving it.

In this manner, the liquid blow molding apparatus 1 can stably mold a container C of a shape conforming to the inner surface of the cavity 12 of the blow molding mold 11 by collecting the liquid L from inside of the preform PF at the timing at which the pressure inside of the preform PF starts rising by pushing of the bottom PFc of the expanded and deformed preform PF by the movable mold portion 11b of the blow molding mold 11 so that the rise in the pressure is suppressed or prevented.

The liquid blow molding apparatus 1 may be configured such that a stretching rod 21 is slidably provided in an insertion hole formed in the central portion of the seal pin 20. In this case, as illustrated in FIGS. 1 and 2, when the stretching rod 21 moves downward (toward the bottom of the cavity 12) with respect to the seal pin 20, it pushes the bottom PFc of the preform PF disposed in the blow molding mold 11 downward and axially (longitudinally) stretches the trunk PFb of the preform PF in the cavity 12. In other words, by using the liquid blow molding apparatus 1 provided with the stretching rod 21, the container C can be produced by the biaxial stretch blow molding in which the preform PF disposed in the blow molding mold 11 is radially stretched by the pressurized liquid L while it is longitudinally stretched by using the stretching rod 21.

Further, when the liquid blow molding apparatus 1 provided with the stretching rod 21 is used, the movable mold portion 11b is provided with the pick pin 11b2, and as illustrated in FIG. 2, the preform PF may be axially stretched with the bottom PFc thereof sandwiched between the front end of the stretching rod 21 and the front end of the pick pin 11b2. It is to be noted that, when the liquid blow molding apparatus 1 provided with the stretching rod 21 is used, the stretching rod 21 is raised to an appropriately set position when the movable mold portion 11b pushes the bottom PFc of the preform PF.

Next, a production method of the container C when the disclosed container production method by liquid blow molding is performed by using the liquid blow molding apparatus 1 configured in the aforementioned manner will be described.

First, the preform PF heated in advance by a heater to a predetermined temperature (e.g. from 80 to 150° C.) at which the stretchability is achieved is attached to the blow molding mold 11 and is clamped. Then, the nozzle unit 13 is lowered so that the blow nozzle 15 is engaged with the mouth PFa of the preform PF.

Next, an expansion and deformation step is performed. In the expansion and deformation step, as illustrated in FIGS. 1 and 2, the seal pin 20 is opened to supply a pressurized liquid L into the preform PF disposed inside of the body mold portion 11a of the blow molding mold 11 so that the preform PF is expanded and deformed.

At this time, the liquid blow molding apparatus 1 may be configured such that the container C may be molded by the biaxial stretch blow molding that employs the stretching rod 21. By using such a biaxial stretch blow molding, misalignment that may occur during molding can be suppressed.

Further, in this case, the preform PF may be axially stretched with the bottom PFc thereof sandwiched between the front end of the stretching rod 21 and the front end of the pick pin 11b2 by using the pick pin 11b2 provided at the movable mold portion 11b. With this configuration, misalignment that may occur during molding can be further suppressed.

The pushing step is performed in parallel with the expansion and deformation step immediately before the expansion and deformation step is completed. As illustrated in FIG. 3, in the pushing step, with the seal pin 20 opened, the movable mold portion 11b is moved relative to the body mold portion 11a toward the expanded and deformed preform PF so that the bottom PFc of the preform PF is pushed by the movable mold portion 11b. Further, the liquid L is collected from inside of the preform PF at the timing at which the pressure inside of the preform PF starts rising by the aforementioned pushing so that the rise in the pressure is suppressed or prevented. It is to be noted that, after the expansion and deformation step is completed, the pushing step may be performed.

In this manner, in the present disclosure, the liquid L is collected from inside of the preform PF at the timing at which the pressure inside of the preform PF starts rising by pushing the expanded and deformed preform PF by the movable mold portion 11b of the blow molding mold 11, and thus a rise in the pressure can be suppressed or prevented. Therefore, according to the present disclosure, a container can be stably molded when the container C is molded by pushing the expanded and deformed preform PF by the movable mold portion 11b of the blow molding mold 11.

Further, according to the present disclosure, in the expansion and deformation step, a pressurized liquid L is supplied into the preform PF by moving the plunger in the pressurized direction, and in the pushing step, the liquid can be collected from inside of the preform PF by moving the plunger in the pressure reducing direction. Thus the configuration of the liquid blow molding apparatus 1 used for the container production method can be simplified.

It goes without saying that the present disclosure is not limited to the aforementioned embodiments, and various changes may be made without departing from the gist of the present disclosure.

For example, a blow molding apparatus that liquid blow molds a preform PF is not limited to the liquid blow molding apparatus 1 configured as illustrated in FIGS. 1 to 3, and a blow molding apparatus configured in various manners may be used. Further, the movable mold portion of the blow molding mold is not limited to those configured to form the bottom of a container, and those configured to form a handle portion (a concave portion for gripping) may be used. In this case, the movable mold portion may be configured as a pair of opposing mold portions that are disposed opposed to each other and are movable relative to each other in approaching and separating directions, for example.

REFERENCE SIGNS LIST

1 Liquid blow molding apparatus
11 Blow molding mold
11a Body mold portion
11b Movable mold portion
11b1 Movable mold portion body
11b2 Pick pin
12 Cavity
13 Nozzle unit
14 Body block
15 Blow nozzle
15a Nozzle body
15b Holding portion
15c Closing surface
16 Supply path
17a First piping
17b Second piping
18a First opening-closing valve
18b Second opening-closing valve
19 Pressurized liquid supply portion
20 Seal pin
20a Tapered surface
21 Stretching rod
PF Preform
PFa Mouth of preform
PFb Trunk of preform
PFc Bottom of preform
L Liquid
C Container
Ca Mouth of container
Cb Trunk of container
Cc Bottom of container

The invention claimed is:

1. A container production method by liquid blow molding in which a pressurized liquid is supplied into a resin preform to mold the preform into a container of a shape conforming to an inner surface of a cavity of a blow molding mold, wherein, as the blow molding mold, one having a body mold portion that forms a part of the inner surface of the cavity and a movable mold portion that forms another part of the inner surface of the cavity is used, the method comprising:
   an expansion and deformation step in which a pressurized liquid is supplied into the preform disposed in the body mold portion to expand and deform the preform; and
   a pushing step in which the movable mold portion is moved relative to the body mold portion toward the expanded and deformed preform so that the expanded and deformed preform is pushed into the container for molding by the movable mold portion, wherein:
   in the expansion and deformation step, the liquid is collected from inside the expanded and deformed preform at a timing at which a pressure inside of the expanded and deformed preform starts rising by the movable mold portion's push so that the rise in the pressure is suppressed or prevented.

2. The container production method by liquid blow molding according to claim 1, wherein in the expansion and deformation step, the pressurized liquid is supplied into the preform by moving a plunger in a pressurizing direction, and in the pushing step, the liquid is collected from inside the expanded and deformed preform by moving the plunger in a pressure reducing direction.

3. The container production method by liquid blow molding according to claim 1, wherein a bottom portion or a handle portion of the container is formed by the movable mold portion.

4. The container production method by liquid blow molding according to claim 2, wherein a bottom portion or a handle portion of the container is formed by the movable mold portion.

5. The container production method by liquid blow molding according to claim 2, wherein a negative pressure is generated by the plunger such that the liquid is drawn from inside the expanded and deformed preform.

* * * * *